United States Patent [19]

Russello

[11] Patent Number: 4,837,764
[45] Date of Patent: Jun. 6, 1989

[54] PROGRAMMABLE APPARATUS AND METHOD FOR TESTING COMPUTER PERIPHERALS

[75] Inventor: Vincent J. Russello, West Haven, Conn.

[73] Assignee: Bunker Ramo Corporation, Shelton, Conn.

[21] Appl. No.: 31,534

[22] Filed: Mar. 26, 1987

[51] Int. Cl.⁴ .............................................. G06F 11/22
[52] U.S. Cl. ........................................ 371/20; 371/15
[58] Field of Search ...................... 371/20, 25, 15, 29, 371/16; 364/200, 900

[56] References Cited

U.S. PATENT DOCUMENTS

| | | | |
|---|---|---|---|
| 3,711,691 | 1/1973 | Breitenbach et al. | 235/153 A |
| 4,168,796 | 9/1979 | Fulks et al. | 235/302 |
| 4,489,414 | 12/1984 | Titherley | 371/20 |
| 4,567,592 | 1/1986 | Minicilli | 371/20 |
| 4,608,531 | 8/1986 | Stephens | 324/73 R |
| 4,718,064 | 1/1988 | Edwards | 371/20 |
| 4,724,378 | 2/1988 | Murray | 371/20 |
| 4,736,374 | 4/1988 | Kamp | 371/20 |

FOREIGN PATENT DOCUMENTS

85091467  3/1984  Japan .
60-10181  1/1985  Japan .
2138979  10/1984  United Kingdom .

Primary Examiner—Michael R. Fleming
Attorney, Agent, or Firm—St.Onge Steward Johnston & Reens

[57] ABSTRACT

An apparatus and method for testing the condition of computer peripherals is provided. The apparatus is portable and enclosed in a housing and comprises a microprocessor, first nonvolatile memory means having stored therein an operating system routine, at least one working memory means for storing an instruction set defining a test protocol, at least one peripheral connector means for operatively connecting said apparatus with a peripheral to be tested in accordance with said protocol, at least one data source connector means for operatively connecting an external data source to said apparatus, a keyboard for receiving user commands for controlling the operation of said microprocessor and sending said user commands to said microprocessor, a display, and second nonvolatile memory means having permanently stored threin a debuffer routine for responding to user commands input through the keyboard to instruct the microprocessor to store an instruction set in working memory defined by data input from said external data source and test said peripheral in accordance with the protocol set forth in said instruction set.

15 Claims, 9 Drawing Sheets

PROGRAMMABLE APPARATUS AND METHOD FOR TESTING COMPUTER PERIPHERALS

BACKGROUND OF THE INVENTION

A. Field of the Invention

This invention relates to apparatus and a method for testing the condition of computer peripherals.

B. Prior Art

Peripheral testers for testing the condition or operability of printers, disk drives, monitors, and the like independently of their computer host are known in the art.

The engineer or user in a normal service environment ordinarily would need access to a host computer system and a diagnostic written for the particular peripheral to be tested in order to troubleshoot the device. In addition, the engineer would also have to be trained in the operation of both the host and the diagnostic.

The peripheral tester solves this problem by being in effect a "mini host" that permits the user to operate the peripheral, without the host, and monitor the peripheral's response to excitation or exercising signals sent out by the peripheral tester.

U.S. Pat. No. 4,489,414 to Titherley discloses microprocessor-based computer peripheral testing equipment employing a plug-in firmware module for releasable plug-in connection with the system containing firmware constituting peripheral test and exercising programming routines. Titherley also discloses and claims a plug-in input/output module providing an interface circuit including line drivers for releasably coupling a computer peripheral to the system.

However, Titherley is limited to the test and exercising routines provided on the firmware modules physically available to the user. Should the user desire to modify the firmware test routine or employ a new test to meet a particular problem with a peripheral encountered in the field, a new module must be prepared. This is time consuming and expensive. Also, an input/output module which will accommodate the variety of peripherals to be tested must be available to the user. The device of Titherley can therefore be unwieldy, inflexible, and limited in its application to many problems encountered in the field.

SUMMARY OF THE PRESENT INVENTION

The present invention provides a peripheral tester for testing computer peripherals in accordance with (1) a test protocol stored on a diagnostic card chosen manually by a user, (2) a test protocol entered by the user through a keyboard on the peripheral tester, or (3) a test protocol entered into memory in the peripheral tester from a computer terminal located at either a local or a remote station.

It is an object of the present invention to provide a programmable peripheral tester having nonvolatile memory means containing an operating system routine and a debugger routine for permitting alteration of the instruction set defining the test protocol locally by the on-site user or remotely from a remote station by a remote user such as a technical support center.

It is a further object of the present invention to provide a programmable peripheral tester that has the flexibility of permitting input of an instruction set defining the test protocols by an on-site user from a keyboard on said peripheral tester.

It is a further object of the present invention to provide a programmable peripheral tester that is capable of accepting an instruction set or sets defining test protocols over a suitable communications link from a terminal located at a remote station.

It is a further object of the present invention to provide a programmable peripheral tester that permits review of the instruction set defining the test protocol and change thereof if necessary.

It is a further object of the present invention to provide a peripheral tester with a plurality of interchangeable plug-in nonvolatile memory means that can be manually selected by the on-site user to choose a desired test protocol. The instruction set is then loaded into a working memory that is isolated from the diagnostic card.

It is a further object of the present invention to provide a peripheral tester that gives a high level of confidence regarding the proper condition and operability of the peripherals as indicated by said peripheral tester.

It is a further object of the present invention to provide a method for testing computer peripherals where a remote station is used to provide a test protocol for a peripheral.

Further objects and advantages of the present invention will become apparent from the following description of the drawings and the preferred embodiments.

DETAILED DESCRIPTION OF THE PREFERRED EMBODIMENT

The peripheral tester of the present invention is a microprocessor based device whose function is to allow an end user to easily test and exercise printers and other types of input/output devices that interface to computers.

The local or on-site user inserts a diagnostic card or plug-in nonvolatile memory means containing a set of instructions or program including a test protocol into the tester and presses a key on a keyboard. The user is then directed by a message on a display to attach the peripheral to the proper one of a plurality of peripheral connectors. The user is then guided step by step through a test for the peripheral until any problems can be isolated.

If the available diagnostic cards do not provide a suitable test program, the user of the present invention has several choices. The user can obtain a new diagnostic card from his technical support center with the desired new or modified program. However, this may be unrealistic because it is expensive and time consuming.

In accordance with the present invention, technical support personnel in a remote home office miles away can write a new or modified set of instructions, and load this program into the peripheral tester from a remote station, such as a computer terminal, over a suitable communications link. Alternatively, the local user who is familiar with the programming languages and peripheral being tested can write a new modified program for meeting the particular needs of the test situation. The local user can then input this program into the peripheral tester by using a computer terminal located locally.

With reference to FIGS. 1, 1A, 1B, and 2, the peripheral tester 10 is housed in a portable case or housing 12 designed for either bench or field use. The housing 12 is preferably made of any suitably durable material, such as for example rigid fiberglass. The housing has a removable cover (not shown) to give easy access to the connector panel indicated generally at 14, which in this embodiment includes three peripheral connectors 32, 34, and 36 for coupling tester 10 to the peripherals to be tested.

Figure 2:
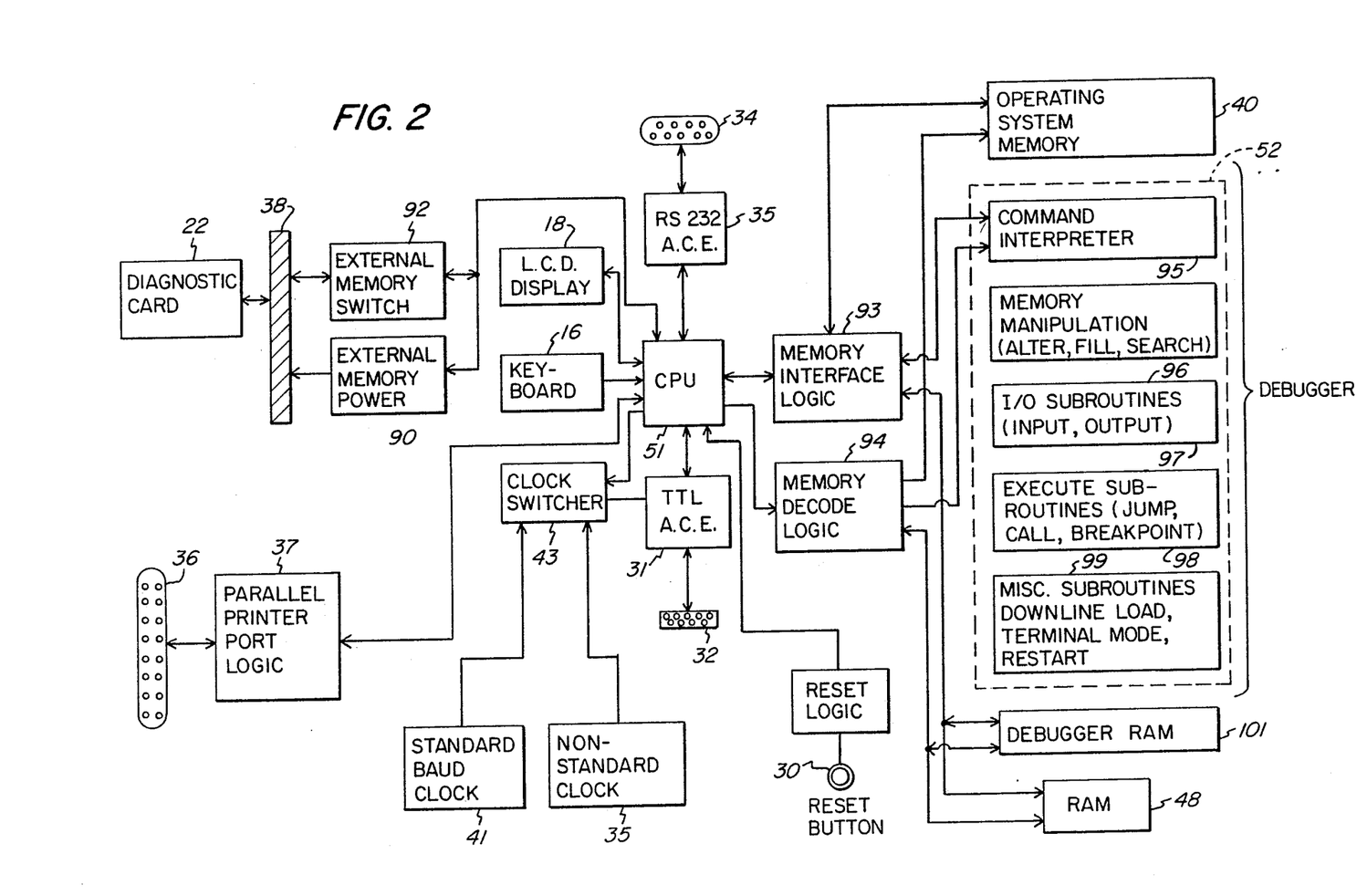
FIG. 2 is a hardware block diagram of the apparatus of the present invention.

Microprocessor 51 is the central processing unit of the peripheral tester 10 and is preferably a Zilog Z-80 micro 2 MHz clock rate unit connected as shown in the hardware block diagram of FIG. 2. Any suitable microprocessor or other CPU can be used as well.

A keyboard 16 is used for local user commands and data input, while the display 18 is used for output. Keyboard 16 is preferably encoded ASCII with membrane switches. The display is preferably an LCD with 2 lines×32 characters, although other suitable equipment well known in the art can be used as well.

The test programs comprise at least one preselected instruction set defining a test protocol for microprocessor 51 to send excitation signals to said peripheral and receive response signals therefrom. By monitoring the excitation and response signals, the peripheral can be stepped through a variety of functions independent of its computer host and its responses noted.

The test programs are available to the local user on a plurality of diagnostic cards 19, which can be any suitable interchangeable plug-in nonvolatile memory means such as a circuit board having one or more EPROMS mounted thereon. Cards 19 are stored in a tray storage section 20. A particularly preferred diagnostic card, such as that indicated in more detail at figure number 22, comprises two EPROMS 17 and associated circuitry well known in the art. Diagnostic card 22 contains at least one instruction set defining a test protocol for the peripheral 33 being tested.

Peripheral 33 is connected to the peripheral tester through peripheral connector 32, explained in more detail below. Peripheral 33 can be a printer, such as a serial or a parallel printer, or other computer peripherals for which service in the field is desired.

The diagnostic cards 19 typically contain at least one program or instruction set for testing a peripheral, although of course depending upon memory size and program length, several programs can be stored on one card. The local user then simply chooses the card, such as for example card 22, that contains a test protocol corresponding to the peripheral 33 to be tested. The program is then loaded into the tester 10, as explained in detail below.

The diagnostic card storage section or tray 20 can accommodate a number of cards 22, each preferably containing two or more peripheral tests.

To the right rear of the unit is the AC power receptacle 24, the AC line fuse 26, power on-off switch 28, and the reset button 30.

The rear center area 14 of the tester 10 is the peripheral connector area. In the preferred embodiment, the connector labeled 32 is a TTL serial port, connector 34 is a RS-232 serial port, and connector 36 is a standard parallel printer port. It is of course understood that the present invention is not limited to only three connectors, as other numbers of connectors can be supplied. These peripheral connectors 32, 34, and 36 are for connecting peripheral tester 10 with the peripheral 33 to be tested, there being a connector provided for each of the different types of peripherals. The peripheral connectors 32, 34, and 36 are also suitably connected to microprocessor 51 as shown by conventional I/O chips 31, 35, and 37 in FIG. 2, so that the microprocessor 51 can apply excitation signals to the peripheral under test and receive response signals therefrom, all in accordance with the test protocol.

The connector labeled 38 is the receptacle for the diagnostic card 22. Connector 38 is accessible to the local user from outside the housing 12 for receiving and mating with a corresponding connector 39 on diagnostic card 22. In the preferred embodiment, connector 38 is a 44 pin P.C. card connector. Connector 39 is operatively coupled to the EPROMS 17 on card 22, so that when power is supplied to the card 22 as described below, the instruction set stored in the EPROMS is transferred or loaded into working memory or RAM 48 under control of microprocessor 51. The card 22 may then be removed and restored in tray or storage area 20, thereby avoiding an awkward obstruction on the operator panel and avoiding the possibility of damage to the card 22, connector 8, or tester 10.

Figure 3:
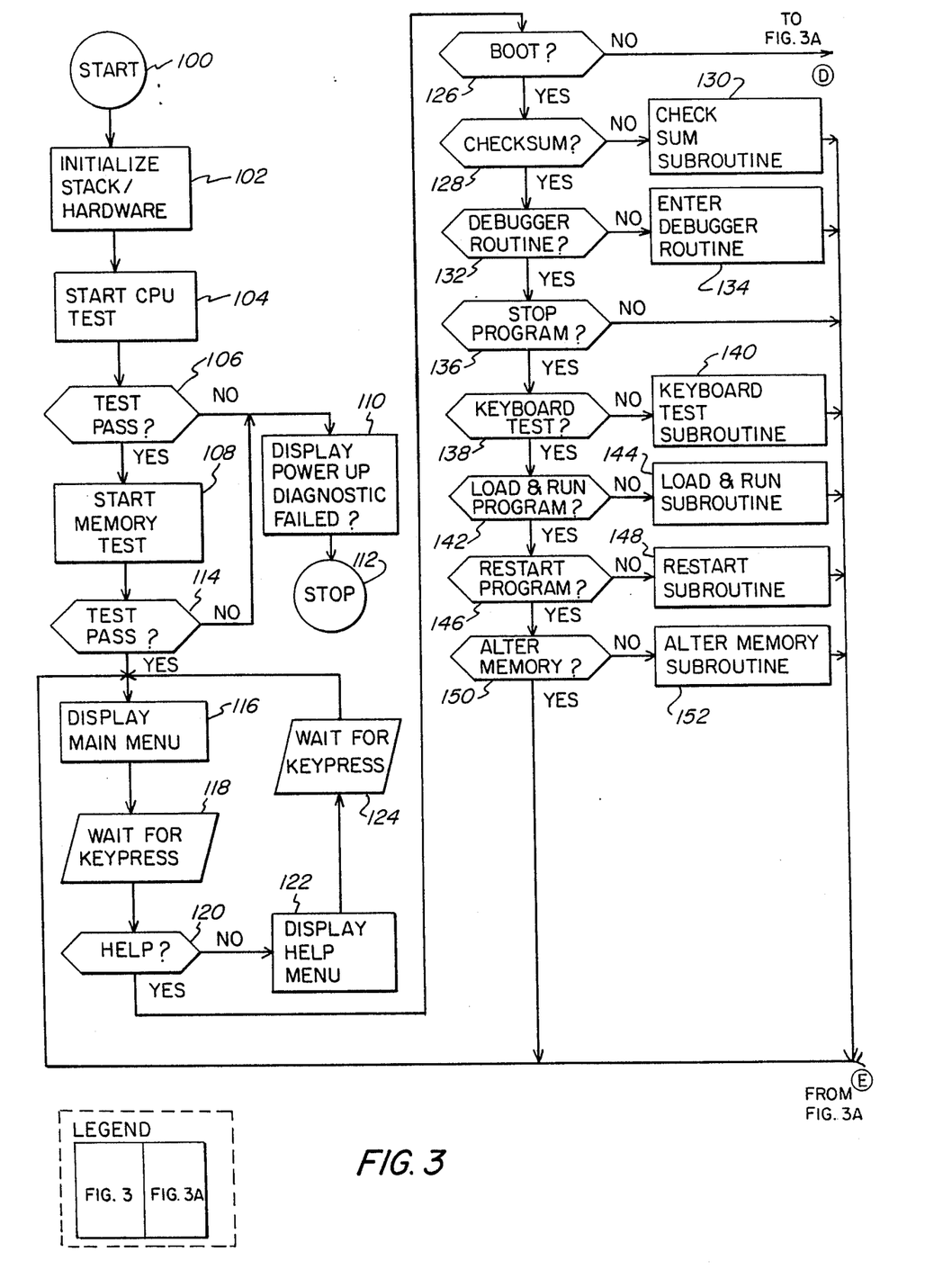
FIGS. 3 and 3A are flow chart diagrams of the operating system routine.
Figure 3A:
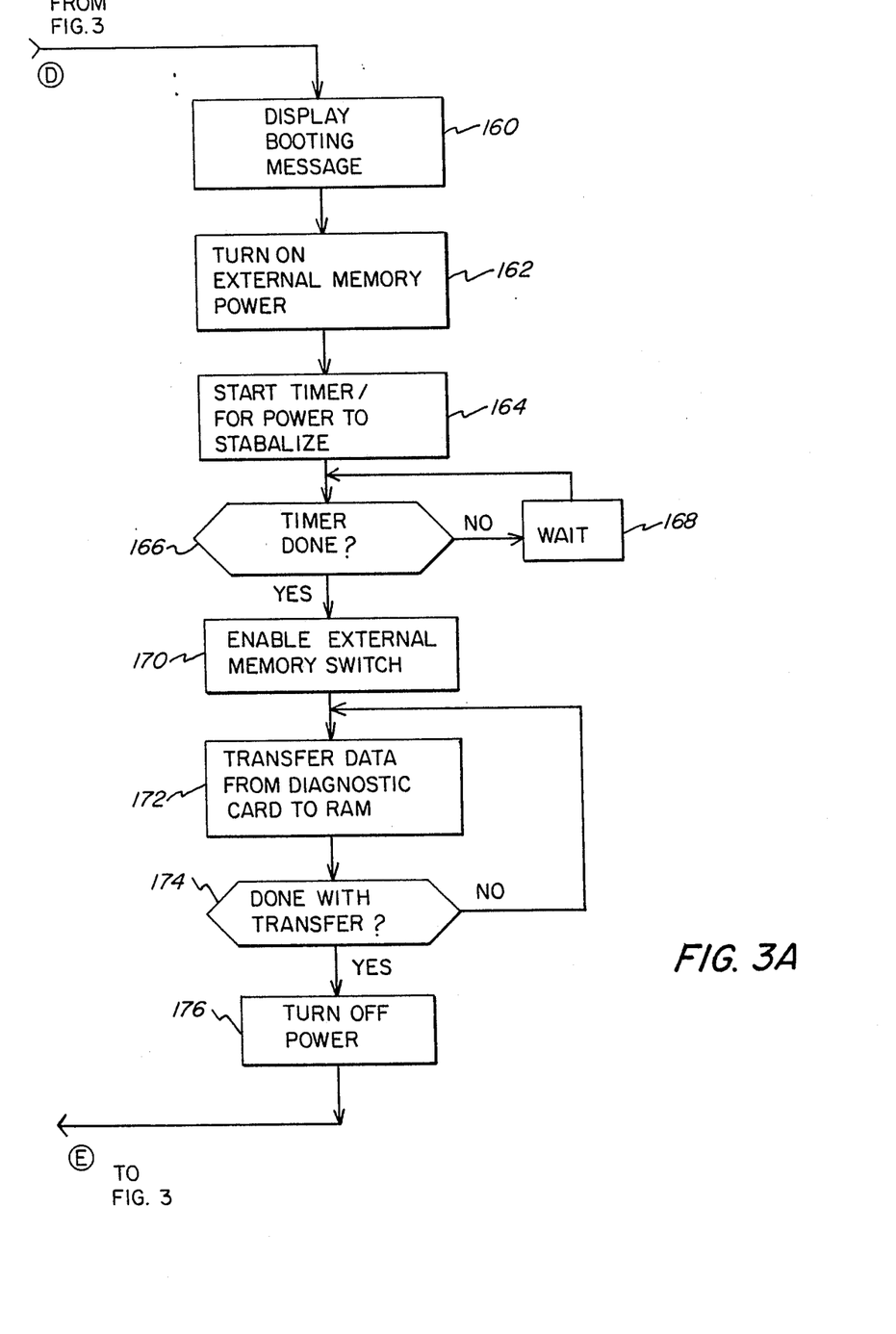

The peripheral tester operating system routine resides in the operating system memory 40, which is preferably a suitable PROM. The operating system routine permanently stored in memory 40 is summarized generally by the flow chart shown in box 42 of FIG. 1B. FIGS. 3 and 3A provide a more complete description of the operating system.

Whenever power is applied (box 44) and initialization has occurred (box 46), the operating system routine will perform its power-up diagnostics subroutines. These diagnostics perform a Z-80 register check on microprocessor 51 and a memory test on RAM 48. These diagnostics are indicated generally by box 50. If an error is encountered during power up, the device will attempt to inform the user by displaying the error on display 18.

The operating system routine will wait for the local user to insert a diagnostic card 22 into connector 38 and press the "L" or "H" key on keyboard 16. If the "L" key is pressed, the operating system routine will turn on power to the diagnostic card 22 and enable its data path through connector 38. The data from the card 22, comprising the instruction set for the test protocol, is read into RAM 48 and a checksum is performed. If the calculated checksum does not match the checksum stored in the diagnostic card 22, the user will be informed by the displayed message "CHECKSUM ERROR". If the checksums do match, then program control will be turned over to the program or instruction set loaded into RAM memory 48. The program will then proceed to make calls to the operating system routine to read a key from the keyboard 16, write a character to the display 18, and carry out the other conventional functions of an operating system routine.

The peripheral tester debugger routine is permanently stored in memory 52, preferably a PROM, and is accessed from the operating system routine as shown in the operating system routine flowchart at box 54. The command "D" entered on keyboard 16 releases control from the operating system routine to the debugger routine indicated generally by box 56 in FIG. 1A and the flowchart therein. Thereafter, the operating system routine ignores all other system functions until the debugger routine is exited as described below and control is returned to the operating system routine. A more detailed explanation of the debugger routine is discussed below with respect to FIGS. 4, 4A, and 4B.

Using the debugger routine, changes to the test program or instruction set can be accomplished not only by the local user, but also by a remote user located at a technical support station perhaps many miles away.

The debugger routine permits a user, either locally or remotely, to easily expand the available test protocols beyond those stored on the diagnostic cards 22 in tray 20. Such tests can be expressed by data comprising an instruction set input from an external data source, such as for example computer terminal 58 located at a remote station. Terminal 58, shown in FIG. 1 as a PC terminal, can be connected to the peripheral tester 10 through modem 60, communications link 62, modem 64, and connector 34. In this manner, a technical support engineer at a home office can write a sophisticated test protocol desired for a particular peripheral and send it electronically to said peripheral tester 10. This avoids the inconvenience and expense of having to prepare a new EPROM for a new diagnostic card, which card well might be used only once for the special peripheral test anyway.

Figure 1:
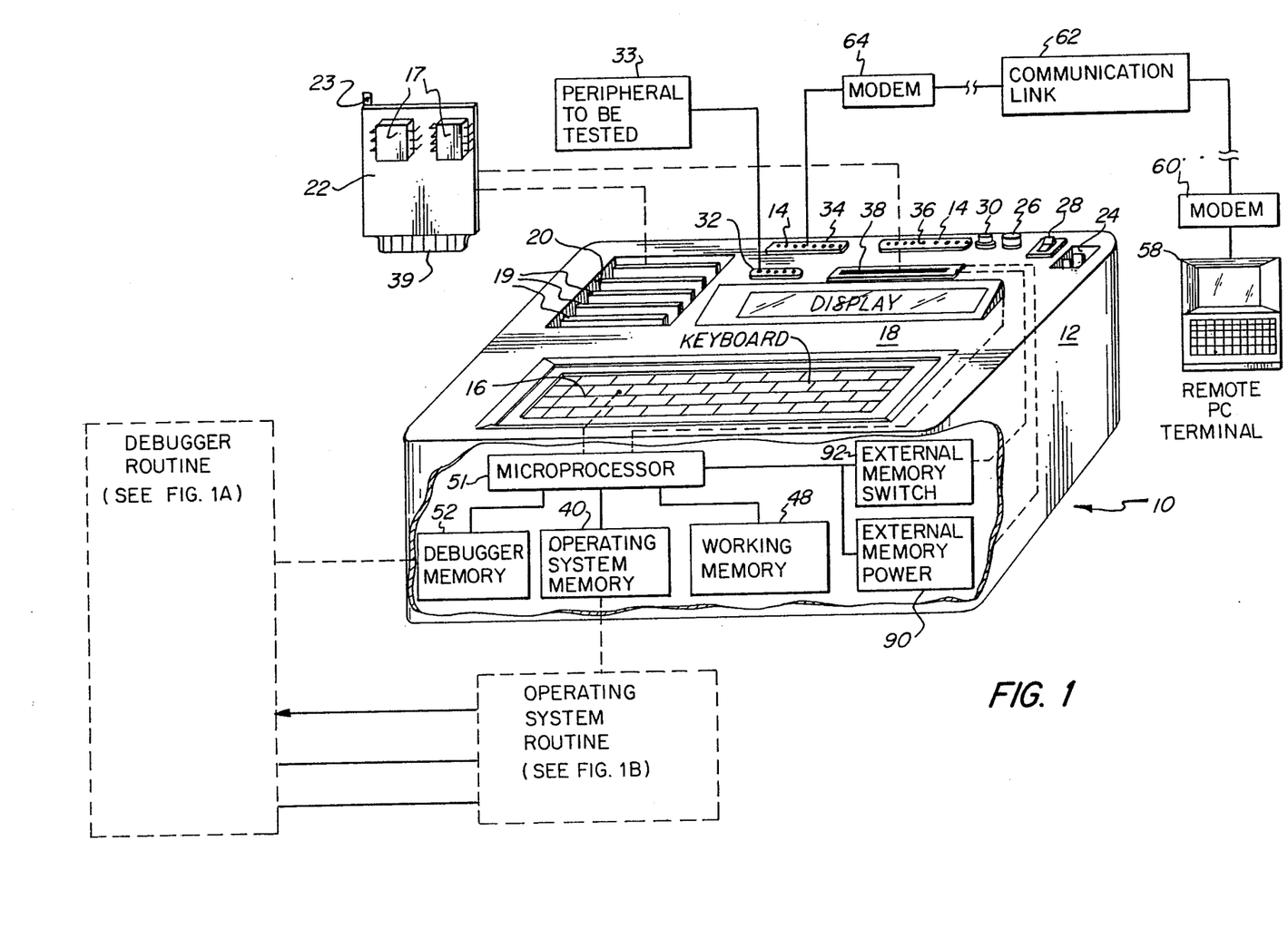
FIGS. 1, 1A and 1B are schematic representations of the apparatus of the present invention.

Computer terminal 58 need not be located at a remote station, as shown in FIG. 1. A technician may have his own PC terminal on-site for assistance in reprogramming peripheral tester 10.

The various features of the debugger routine are summarized in box 56 and are discussed in more detail below. After the debugger routine is started (box 66), a user is given a choice of selecting a variety of features or subroutines by entering the appropriate commands on a computer terminal, such as terminal 58, which can be either local or remote, connected to terminal 34.

A user, either local or remote, may load a preselected program or instruction set into RAM memory 48 from an external data source (boxes 69 and 70) by loading data defining the instruction set from an external data source such as terminal 58 into RAM 48. This permits loading of a program from another computer, such as a personal computer terminal, that a local user has written to meet the particular test requirements at hand. Alternatively, the computer may be located remotely at a technical support station.

The user, either local or remote, may output data supplied by that user to a selected port such as connectors 32, 34, or 36 (boxes 71 and 72). In this fashion, a user can input data on a computer terminal and have it sent directly to the peripheral under test, thereby allowing the user to exercise the peripheral or step the peripheral through a variety of commands recognizable by the peripheral.

The user, either local or remote, may load a program or instruction set into memory from a computer terminal, which may be either local or remote (boxes 73 and 74). If the local user is sophisticated and sufficiently familiar with the program operation, he may write his own program with the aid of a local terminal. Alternatively, technical support could telephone or otherwise communicate the program or set of instructions to the local user for entry through PC terminal 58.

The debugger terminal subroutine allows a local or remote user to send data from a terminal, such as a PC terminal, directly to a selected port or connector (boxes 75 and 76). In this manner, the terminal such as a user operated PC terminal can be used to directly drive the peripheral under test. Additionally, this PC terminal can also be located remotely with a communications link such as the PC terminal arrangement indicated by figure numbers 58, 60, 62, and 64 in FIG. 1.

Other miscellaneous debugger subroutines indicated generally at boxes 77 and 78 are provided and are discussed in more detail below with respect to FIGS. 4, 4A, and 4B.

When entry of a modified program is complete, the debugger routine can be exited to the operating system routine at boxes 79 and 80 to run the program now in working memory as shown at boxes 81 and 82. The debugger routine can also be exited and operating system routine entered as shown generally at boxes 83 and 84.

The test sequence can be ended and the peripheral tester powered down by the operating system as indicated at boxes 85 and 86, which is typically accomplished simply by turning the AC power switch 28 to the "off" position.

FIG. 2 is a hardware block diagram showing the construction of tester 10 from components well known in the art. Each diagnostic card 22 is preferably capable of holding 4K of data. The system RAM 48 is 6K of static memory. Serial communication is done through port 34 preferably using an 8250 A.C.E. (asynchronous communications element). These chips can be programmed from DC to 56K baud in many combinations of start, stop, word length and parity. The TTL port 32 uses two types of clocks, one for the nonstandard BCS-90 baud rates shown as 35 in FIG. 2, and the other for standard baud rates (300, 600, etc.) shown as 41 in FIG. 2. Clock switcher 43 switches back and forth between clocks 41 and 35 to select the proper clock for the peripheral being tested. The parallel port 36 uses a 8255 chip 37. It is wired and programmed to comply with Centronics parallel printer standards.

Diagnostic card power is controlled by an external memory switch 92, such as for example a dip reed relay, which under control of the operating system routine applies power to the card 22 from external memory power 90 and enables its data path. With this arrangement, the diagnostic card 22 is isolated from the system until the program is ready to be loaded.

The "STOP" key on the keyboard will cause the microprocessor 51 to interrupt and abandon its current task, reset its program stack, and return to the operating system routine.

Conventional memory interface logic 93 and memory decode logic 94 are provided for interfacing microprocessor 51 with the memory chips.

Memory is allocated generally as follows. PROM 40 contains the operating system routine. PROM 52 contains the debugger routine and is conveniently broken down into memory block 95 for containing the command interpreter subroutine for selecting a function of the debugger routine in response to a valid command entered through the keyboard, memory block 96 for manipulation of data to alter, search, and/or fill working memory, memory block 97 for containing I/O subroutines, memory block 98 for executing subroutines, and memory block 99 for containing miscellaneous subroutines for downline loading, the terminal subroutine, and restarting. RAM 101 provides a scratchpad memory for use during the debugger routine. Working memory is provided by RAM 48.

BASIC OPERATION

The local user begins the test sequence for the peripheral tester 10 by connecting tester 10 to a 115 volt AC power source and powering up the unit. Display 18 will display "INSERT DIAG. CARD AND PRESS 'L' TO LOAD OR PRESS 'H' FOR HELP". This message will also appear whenever the user presses the "STOP" key or the RESET button.

The "L" command is used to load and execute the software contained on a diagnostic card 22. The "H" command will display the other possible commands of the operating system and then return to the operating system's main menu.

To test a device, the local user manually selects a diagnostic card 22 that includes the desired peripheral test routine and plugs it into connector 38. The "L" key is pressed on the keyboard. LED 23 on the diagnostic card will flash momentarily as the diagnostic or applications program is loaded into system memory RAM 48. The user may then remove the diagnostic card 22 and return it to the storage area 20. If the data from the diagnostic card is not read by microprocessor 51, then the message "RESTART ERROR" will be displayed. A faulty EPROM or incorrect software will display "CHECKSUM ERROR".

If data is valid, control is turned to the test program for execution.

Once the test program is loaded and running, a peripheral selection menu will be displayed. The user enters the identifying number of the peripheral he wishes to test. The peripheral tester prompts the user to attach the peripheral to the proper connector.

A sub-menu of peripheral tests will appear. For example, an "ASCII" test and a "USER" test are typically provided for a printer. The "ASCII" test will send to the printer the entire printable "ASCII" character set in a barber pole pattern. This pattern will print each character in every position on the device, thereby allowing the user to determine if the device drops any characters. The "USER" test allows the user to enter a chosen pattern to check for special device problems on keyboard 16. If a detectable peripheral error occurs, then the peripheral tester will display the error condition before restarting the test and will pause until the "RETURN" key is pressed.

The peripheral tester 10 has a "STOP" key located on the upper right side of the keyboard. When the "STOP" key is pressed, the tester will stop its current task and return to the system's main menu. The user may load in a new diagnostic card 22 or restart the previous test.

The peripheral tester also displays a "heartbeat", which signifies to the user that the tester is working. The system will alternately display the "<" and ">" symbols on the first line of the display 18 in the first character position. The heartbeat will "flip" when a device is under test. The rate will vary according to the device under test. If the "heartbeat" does not flip, the user is thereby notified to reset the tester and try the test again. If the problem persists, either the tester has failed or a software problem exists.

This heartbeat feature gives the user confidence that the peripheral tester is in fact operational to test the peripheral.

OPERATING SYSTEM ROUTINE

FIGS. 3 and 3A provide a flowchart of a more detailed explanation of the operating system routine of the peripheral tester 10 of the present invention. FIG. 3 is an elaboration on box 42 of FIG. 1B to show further details of the operating system routine.

With reference to FIGS. 3 and 3A, the sequence starts at box 100. The memory stack and hardware are initialized (box 102), and a test of the CPU or microprocessor 51 is started to determine whether the CPU is operating properly (box 104). If the test is passed, the memory test is then started (boxes 106 and 108); however, if the CPU test is not passed, then a diagnostic message is sent to the user on display 18 that the "power up" diagnostic has failed and the test is stopped (boxes 110 and 112). If the memory test passes, then the peripheral tester's main menu is displayed on display 18 (boxes 114 and 116); however, if the memory test fails, then the tester 10 will attempt to inform the user of the defective component and the test is stopped (boxes 110 and 112).

After initialization and conduction of system diagnostic tests, the peripheral tester displays the main menu (box 116) and waits for the user to enter a command by pressing a suitable key (box 118). The commands and functional descriptions thereof are listed as follows, with references to the appropriate boxes in FIG. 3:

| Command | Functional Description |
|---|---|
| B | Boot: This command will turn on power to the diagnostic card 22 and read the data into RAM 48. Program control is returned to the operating system (boxes 126 and 160–176); |
| C | Calculated Checksum: This is the same as boot, but a checksum will appear on display 18 (boxes 128–130); |
| D | Debugger Mode: Will release control to the debugger routine and ignore all other system functions (boxes 132–134); |
| H | Help: this command gives a brief description of each operating system command. To abort this command keep pressing the return key until the main system menu appears, or press "STOP" (boxes 120–122); |
| R | Restart program: This command will allow the code residing in RAM memory to be executed again without having to reload the diagnostic card 22. This command may be used as long as there is a program in RAM (boxes 146–148); |
| K | Keyboard test: This test will read the keyboard and write the data on the display 18. Only the printable keys will be displayed (boxes 138–140); |
| L | Load-Run Program: This command will load the diagnostic card 22 software into RAM 48, perform a checksum and then release control to that application program for testing the peripheral (boxes 142–144); |
| S | Alter RAM Memory: This command will prompt the user for a memory address. It will then display the data at that address. The local user may alter the data by entering new data on the keyboard 16 (boxes 150–152). |

The test program can be stopped at box 136.

A particularly important aspect of the BOOT command concerns the manner in which the contents of the EPROMS on cards 22 are loaded into working memory. As described in FIG. 3 at boxes 160 through 176, the contents of the EPROMS are loaded into RAM by using external memory switch 92 and external memory power source 90 to isolate the main peripheral tester hardware from the EPROMS. The boot command transfers the instruction set into the working memory RAM 48, where it can be modified using the debugger routine.

More particularly, the subroutine is begun by displaying a booting message to the user on display 18 (box 160). Then external memory power 90 is turned on (box 162). After a time out loop for waiting until power has stabilized (boxes 164, 166, and 168), the external memory switch 92 is enabled and data is transferred from the card 22 to RAM 48 (boxes 170, 172, and 174). When data transfer is complete, external memory power is turned off and return is made to the operatings system routine (BOX 176).

THE DEBUGGER ROUTINE

Figure 1A:
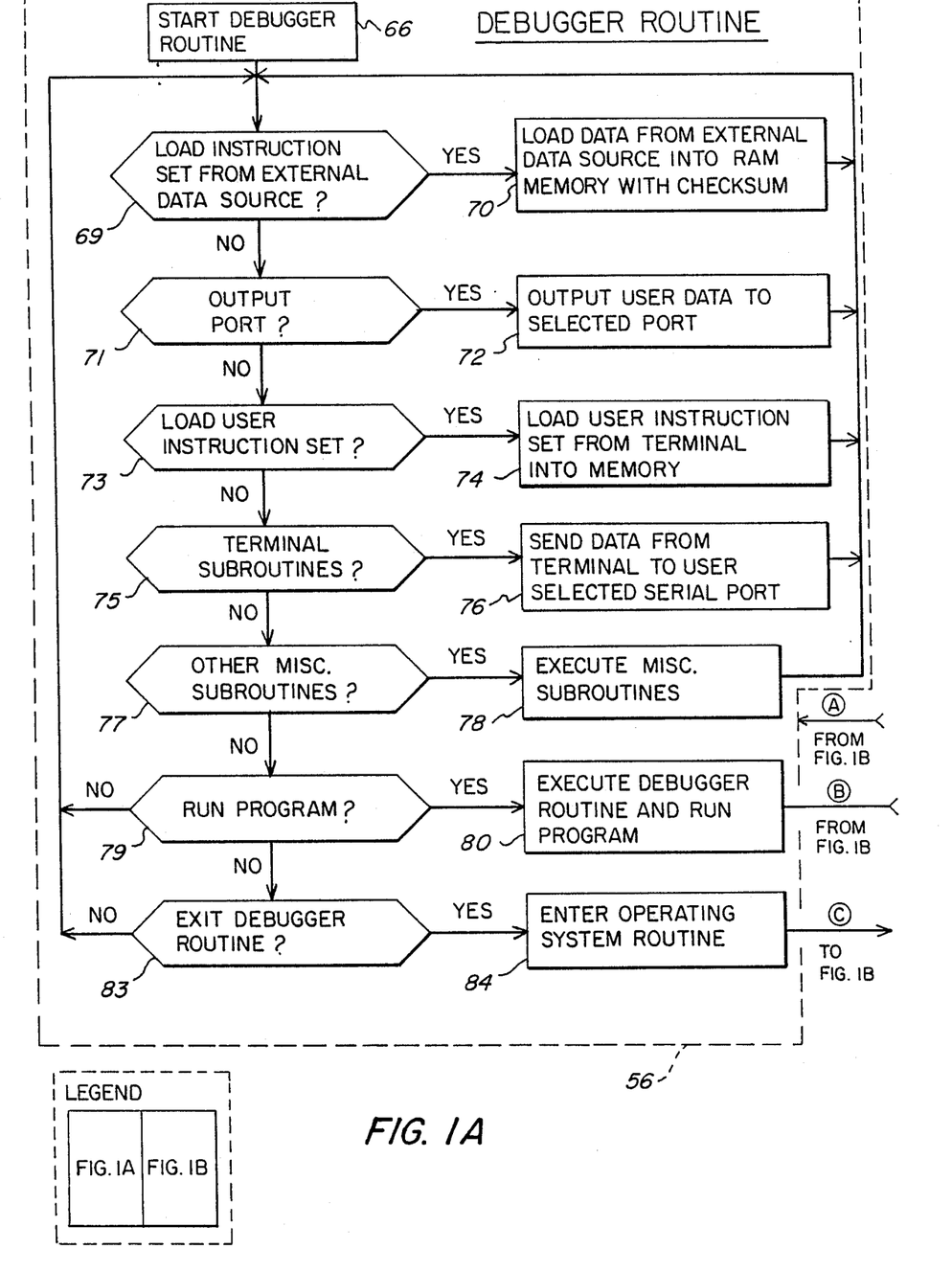
Figure 1B:
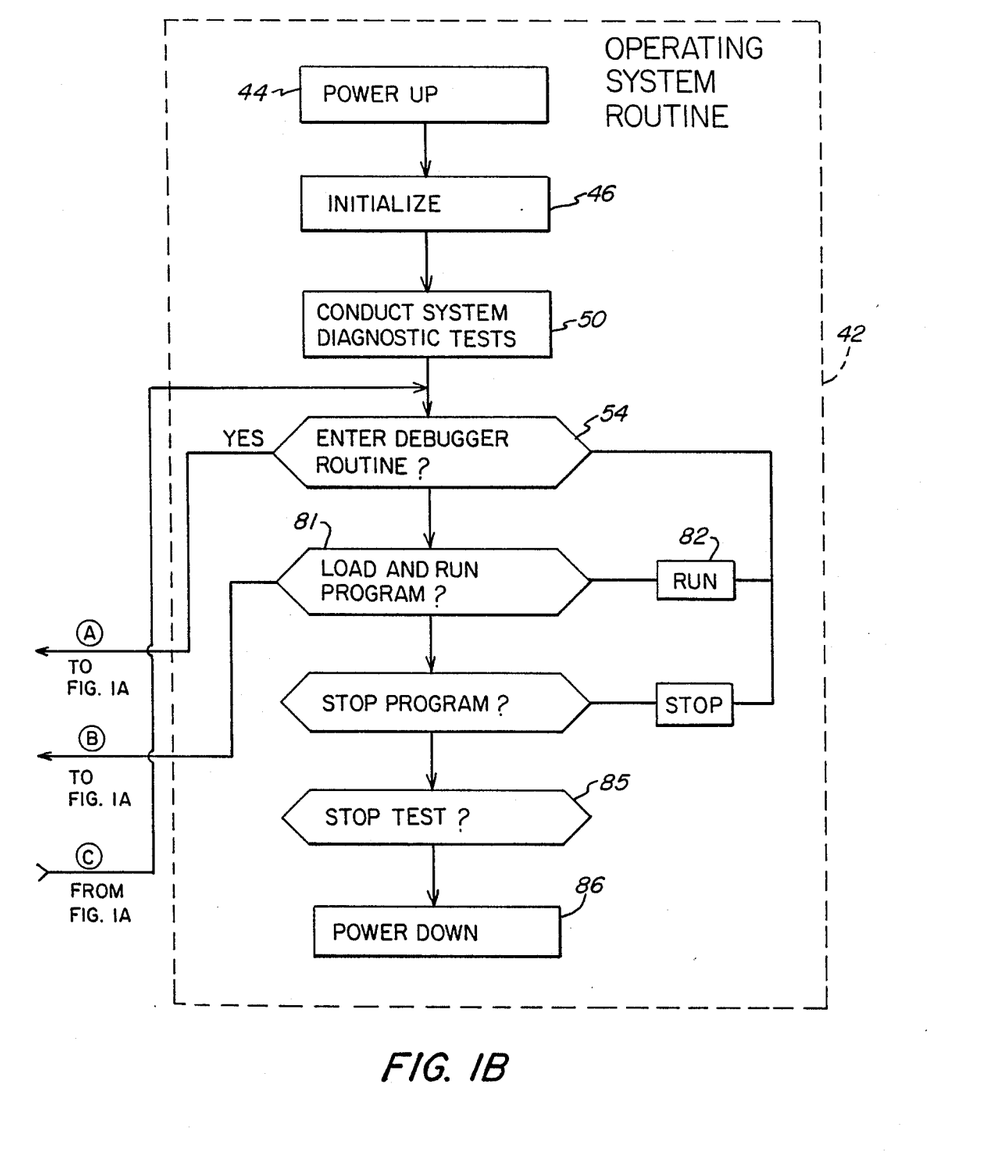
Figure 4:
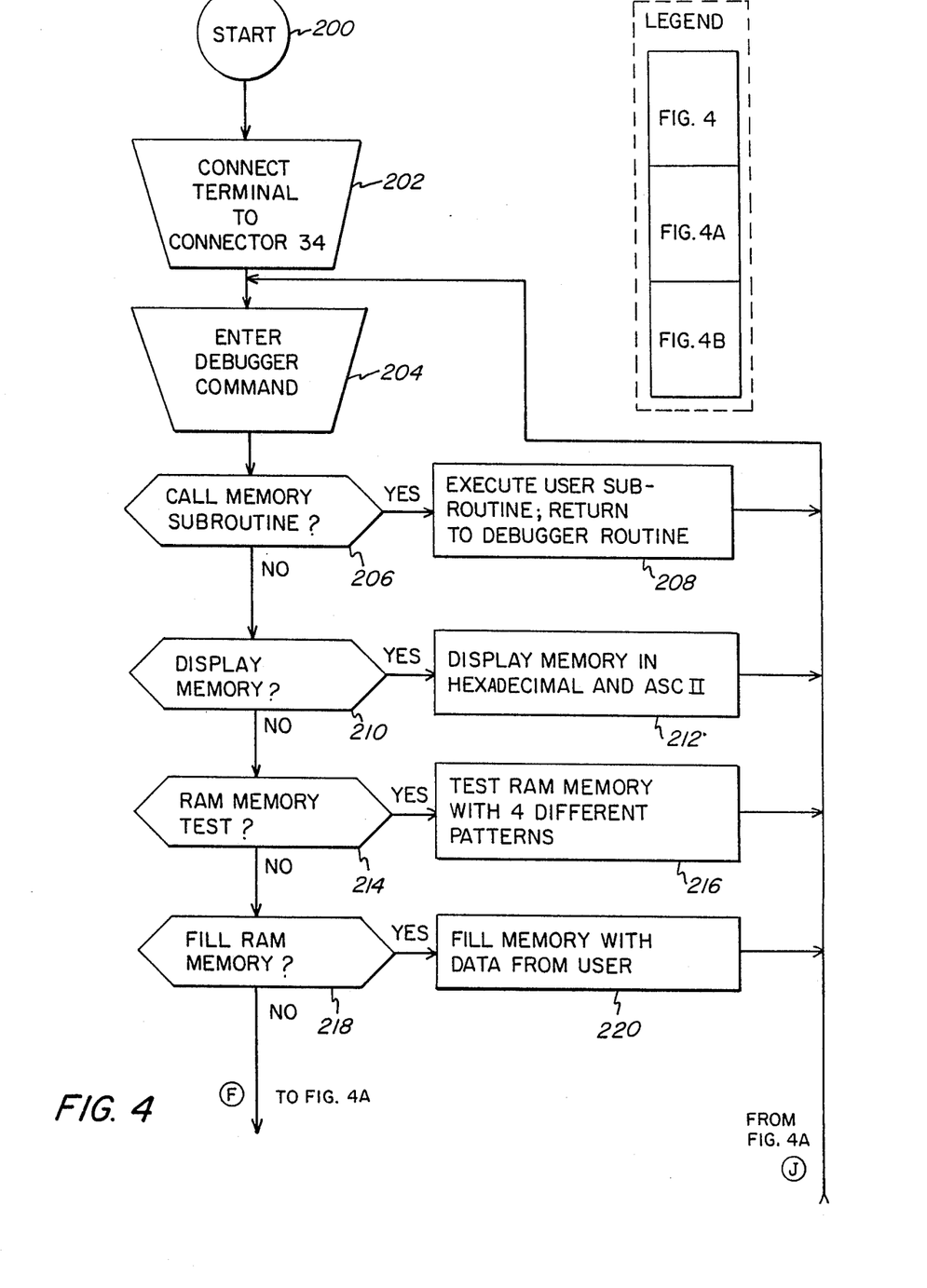
FIGS. 4, 4A and 4B are flow chart diagrams of the debugger routine.
Figure 4A:
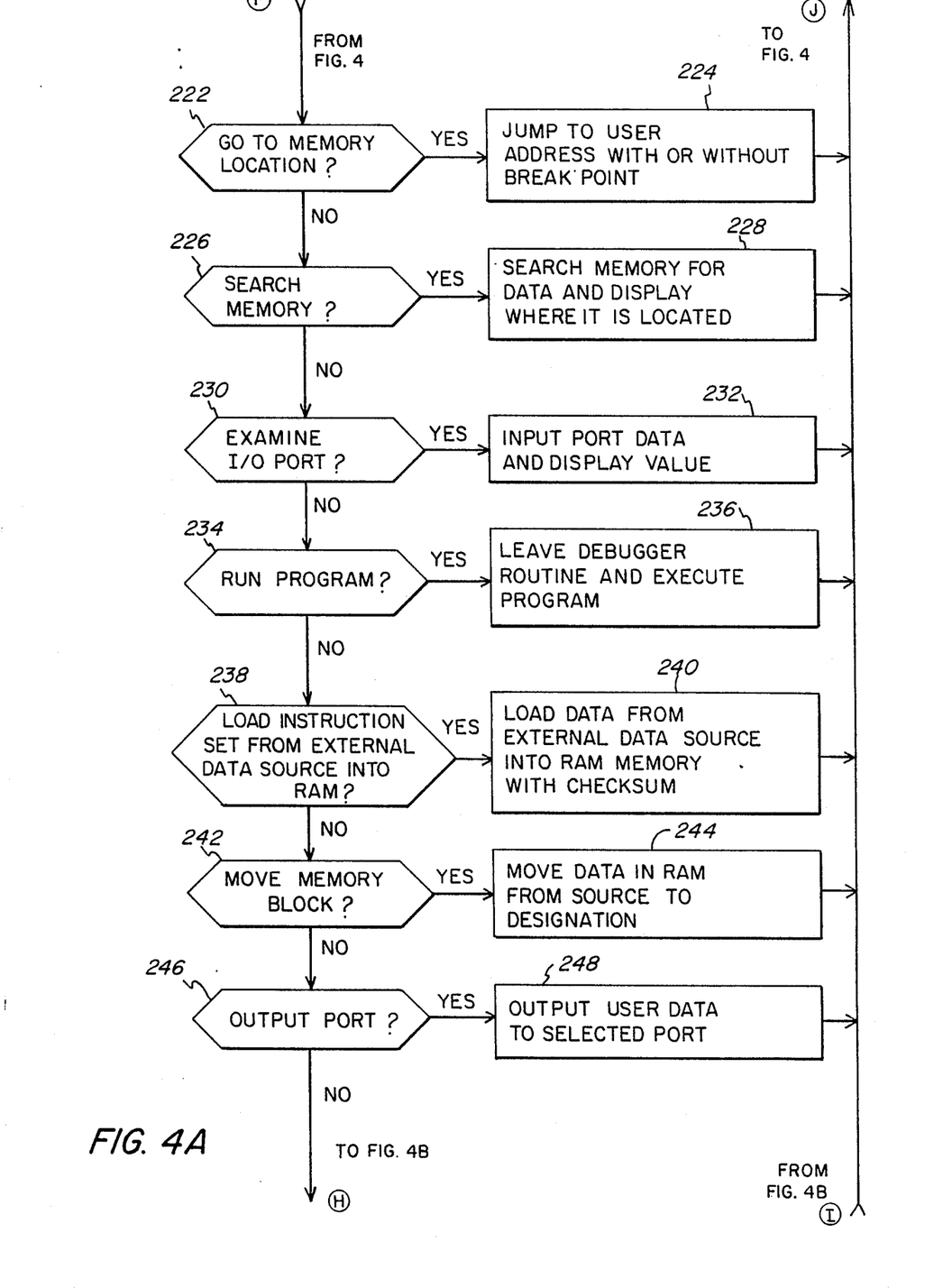
Figure 4B:
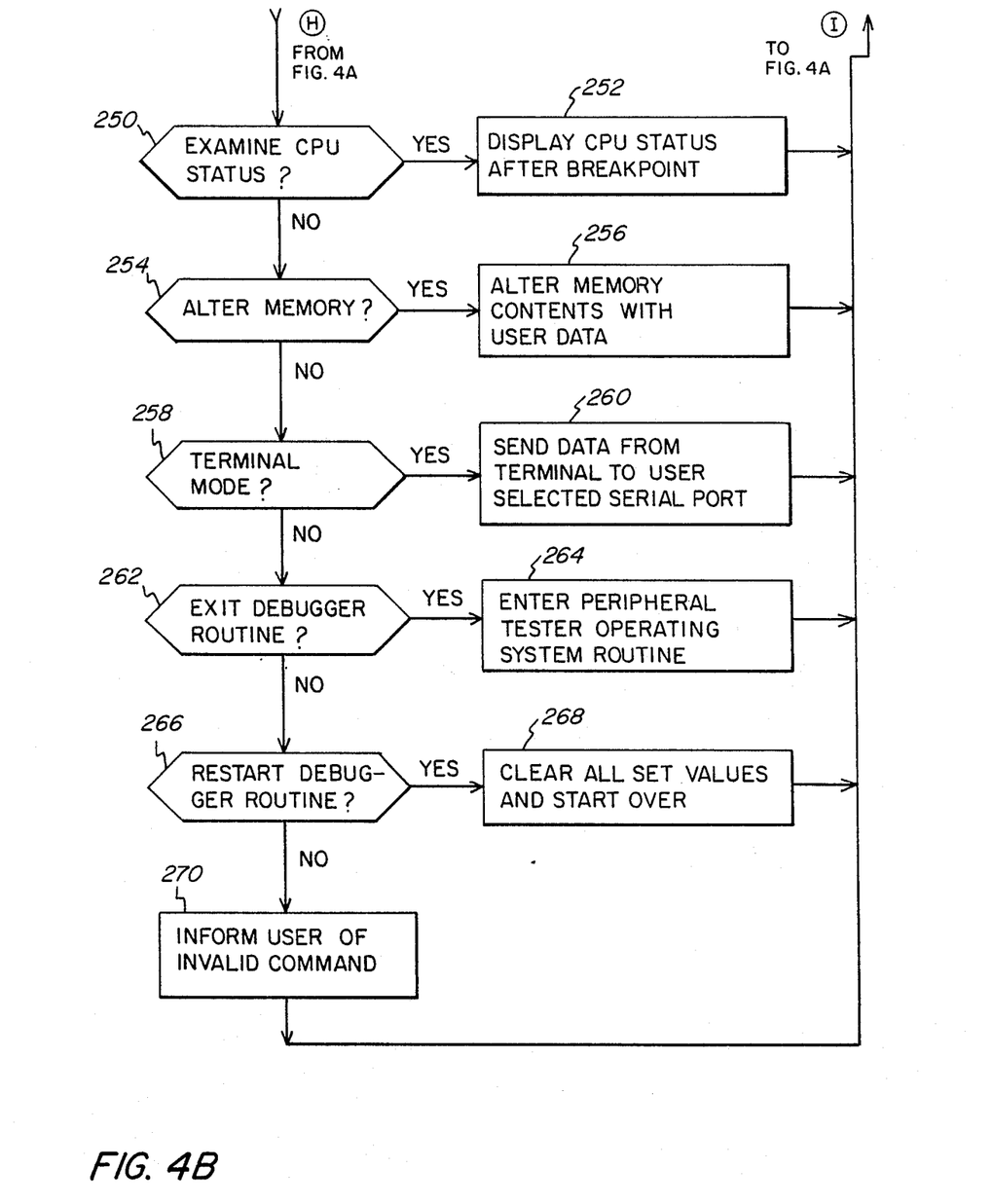

FIGS. 4, 4A, and 4B are more detailed descriptions of the debugger routine already summarized generally above in box 56 with respect to FIG. 1A.

FIG. 4 shows the debugger routine being started at box 200.

The first step is for the local user to connect the computer terminal to the peripheral connector on tester 10. In the preferred embodiment, the terminal is connected to connector 34 (box 202). The computer terminal may be on-site, or local, for the local user. Alternatively, there may be a second or remote user who operates a remotely located terminal from a technical support station. This alternative arrangement is shown in FIG. 1, although it is understood that a local terminal can be operated by the local user as well.

Typically, the debugger routine is entered from operating system at boxes 132 and 134 (FIG. 3), when the local user enters the command D (box 204) on the keyboard 16.

Once the debugger routine is entered at box 204, the user, whether local or remote, has a choice of sixteen subroutines as represented by decision boxes 206, 210, 214, 218, 222, 226, 230, 234, 238, 242, 246, 250, 254, 258, 262, and 266 in FIGS. 4, 4A, and 4B. These subroutines or functions are accessed by the appropriate commands input by the user through the computer terminal, such as terminal 58. It is understood that these decision boxes could have been drawn in any order, since the program continues to loop around the chain of decision boxes until the microprocessor 51 sees a command from the debugger menu.

The "call memory" subroutine allows the user to execute a user subroutine and then return to the debugger routine (boxes 206–208). This allows the user to test user subroutines one at a time to assist the user in writing more complex programs.

The "display memory" subroutine permits the user to display memory in hexadecimal and ASCII (boxes 210–212). The contents of memory may be displayed two lines at a time on display 18, or if a PC terminal 58 is being used, the memory contents may be shown in matrix form on the PC screen. This enables a user, or for example a technical support manager at the home office, to review memory contents preparatory to altering memory to, for example, insert a new or modified program step.

The "RAM memory test" subroutine permits the user to test RAM memory 48 with four different patterns (boxes 214 and 216). This allows the RAM test to run indefinitely until the user tells it to stop.

The "fill RAM memory" subroutine permits RAM 48 to be filled with data from the user entered through keyboard 16 (boxes 218 and 220). In this fashion, the user can load a program through the computer terminal for conducting a specific test.

The "go to memory location" subroutine permits the user to go to a particular location in RAM 48 identified by address (boxes 222 and 224). This enables the user to change the data in a specific location or locations, so as to change a program line or lines.

The "search memory" subroutine allows memory to be searched for particular data and displayed along with an identification of where the data is located (boxes 226 and 228). In this way a user may find a particular program step sequence in memory and change it.

The "examine I/O port" subroutine allows the user to input and output data from a source external to the peripheral tester 10 (boxes 230 and 232).

The user may leave the debugger routine and run the new program as shown at boxes 234 and 236.

Boxes 238 and 240 describe loading a program from the external data source, such as a computer terminal, into RAM memory with a checksum. It is this subroutine that describes the use of a terminal, such as remote PC terminal 58, to modify the contents of RAM 48 to provide a new program for exercising the peripheral.

A memory block can be moved from a source in RAM to a designated location (boxes 242 and 244). This permits the user to move blocks of memory from one location to another to facilitate the user's writing of new programs.

The "output port" subroutine provides for outputting user data to a selected port or connector 32, 34, or 36 (boxes 246 and 248). This accords the user an opportunity to use keyboard 16 or other data source to send data directly to the peripheral 33 under test. For example, the user can send a string of characters from the keyboard to a printer to determine whether the printer prints them properly.

The "examine CPU status" subroutine (boxes 250 and 252) is for permitting the user to examine the results of a program at a specific point chosen by the user.

The "alter memory" subroutine permits the user to alter memory contents with user data (boxes 254 and 256). This option can be most effectively used with the search memory subroutine or go to memory location subroutine in order to change specific data or program steps already in RAM 48.

The "terminal mode" subroutine allows transmission of data from a terminal, such as remote PC terminal 58, directly to peripheral 33 for exercising the peripheral under direct terminal control (boxes 258 and 260). Thus PC terminal 58 becomes a host that can be used to drive the peripheral in a variety of ways that may not be practical with the peripheral tester alone.

The "exit debugger" subroutine (box 262) gives the user the option of leaving the debugger routine and returning to the peripheral tester operating system (box 264) as described in FIG. 3. The debugger routine can be restarted as described at boxes 266 and 268.

The "inform user invalid command" subroutine (box 270) indicates to the user on display that they failed to choose a valid one of the sixteen commands.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. Apparatus for conducting testing of the condition of computer peripherals, said apparatus being portable and enclosed in a housing and comprising:
   (a) a microprocessor for controlling the testing of said peripherals by sending excitation signals to said peripherals in accordance with a test protocol and receiving response signals therefrom;
   (b) nonvolatile memory means having stored therein an operating system routine for said microprocessor;
   (c) at least one working memory means for said microprocessor, said working memory means for storing an instruction set defining said test protocol for said microprocessor;
   (d) at least one peripheral connector means for operatively connecting said apparatus with a peripheral to be tested in accordance with said protocol, said peripheral connector means connecting said microprocessor to said peripheral to enable said microprocessor to send said excitation signals in accordance with said protocol and receive said response signals;
   (e) at least one data source connector means for operatively connecting an external data source to said apparatus, said external data source being distinct from said apparatus;
   (f) a keyboard, mounted in said housing and accessible to a user, being operatively connected to said microprocessor for receiving user commands for controlling the operation of said microprocessor and sending said user commands to said microprocessor;
   (g) a display mounted in said housing for providing an indication to the user of the status of the protocol and the condition of the peripheral; and
   (h) a debugger routine stored in said nonvolatile memory means and accessible by the user through the keyboard, said debugger routine for responding to user commands input through the keyboard to instruct the mircoprocessor to modify said instruction set in working memory as defined by data input from said external data source and test said peripheral in accordance with a modified protocol set forth in a modified instruction set;
   whereby said external data source can provide a modified protocol for testing said peripheral.

2. The apparatus of claim 1, wherein said external data source includes a computer terminal located remotely from said apparatus and said debugger routine comprises a sub-routine for enabling said working memory to receive said instruction set from said computer terminal.

3. The apparatus of claim 1, wherein said external data source includes a computer terminal located remotely from said apparatus, and said debugger routine comprises a sub-routine for enabling said computer terminal to send excitation signals to sad peripheral and to receive response signals therefrom.

4. Apparatus for conducting testing of the condition of computer peripherals, said apparatus being portable and enclosed in a housing and comprising:
   (a) a microprocessor for controlling the testing of said peripherals by sending excitation means to said peripherals in accordance with a test protocol and receiving response signals therefrom;
   (b) nonvolatile memory means having stored therein an operating system routine for said microprocessor;
   (c) at least one working memory means for said microprocessor;
   (d) a plurality of interchangeable plug-in nonvolatile memory means, each said plug-in memory means corresponding to a peripheral to be tested and containing at least one instruction set defining said test protocol for said microprocessor, each said plug-in memory means having at least one memory connector means operatively coupled to said plug-in nonvolatile memory means;
   (e) means mounted in said housing for storing said plug-in memory means, said storing means being accessible to a user for manually selecting a desired one of the plug-in memory means corresponding to a peripheral to be tested;
   (f) receptor means accessible to said user from outside said housing for receiving said memory connector means on a selected plug-in memory means, said receptor being operatively connected to said microprocessor to enable communication from said plug-in memory means to said working memory;
   (g) means for enabling said microprocessor to control transfer of said instruction set from said plug-in memory means to said working memory through said receptor means, whereby said instruction set can be loaded into said working memory and said plug-in memory means can thereafter be removed from said receptor means and returned to said storing means;
   (h) at least one peripheral connector means for operatively connecting said apparatus with a peripheral to be tested in accordance with said protocol, said peripheral connector means connecting said microprocessor to said peripheral to enable said microprocessor to send said excitation signals to said peripheral in accordance with said protocol and receive response signals therefrom;
   (i) a keyboard mounted in said housing and accessible to a user, said keyboard being operatively connected to said microprocessor for receiving user commands for controlling the operation of said apparatus and sending said user commands to said microprocessor;
   (j) a display mounted in said housing for providing an indication to the user of the status of the protocol and the condition of the peripheral; and
   (k) a debugger routine stored in said nonvolatile memory means accessible by the user through the keyboard, said debugger routine for responding to user commands to instruct the microprocessor to store a modified instruction set in working memory defined by data input from an external data source distinct from said apparatus and test said peripheral in accordance with a modified protocol set forth in the modified instruction set;
   whereby the protocol supplied to working memory can be modified under user control to provide a modified protocol for testing said peripheral.

5. The apparatus of claim 4, wherein said operating system routine contains a subroutine for altering preselected portions of working memory in response to data input by the user through said keyboard, whereby said protocol can be modified by user input data to provide a modified protocol.

6. The apparatus of claim 4, wherein said operating system routine contains a subroutine for accessing said debugger routine in response to a command entered by the user through said keyboard, and said modified protocol is defined by data from an external data source comprising a station located remotely from said peripheral tester, and said debugger routine includes a subroutine for loading said data from said station into said working memory in response to a command input through said external data source, whereby a modified test protocol from a remotely located station can be loaded into said working memory of said apparatus.

7. The apparatus of claim 6, wherein said debugger routine further includes a subroutine accessible by said user through said keyboard for exchanging data between said remotely located station source and said peripheral under test, said remote station thereby being enabled to remotely apply excitation signals to said peripheral and monitor the response thereto to obtain an indication of the condition of said peripheral.

8. The apparatus of claim 4, wherein each said plug-in memory means includes a circuit board having at least one PROM mounted thereon, said memory connector means comprises at least one electrical coupling for mating with said receptor means to establish an electrical path therebetween, and said enabling means comprises at least one switching means operating under microprocessor control for activating said receptor means in response to a command input by the user from the keyboard to effect the transfer of said instruction set from said PROM to said working memory, said receptor means thereafter being deactivated and said PROM being thereby isolated from said working memory.

9. The apparatus of claim 4 comprising at least three peripheral connector means, each of said peripheral connector means being arranged for coupling with at least one peripheral to be tested, and said operating system routine includes a subroutine for responding to said instruction set loaded into working memory from said plug-in memory means to provide an indication to the user through said display which peripheral connector means is arranged for connection to the peripheral to be tested.

10. The apparatus of claim 9, wherein at least one of said peripheral connector means is arranged for connection to a remote station through a communications link, and said debugger routine includes a subroutine for receiving data from said remote station, said data defining a modified test protocol for a peripheral to be tested.

11. Apparatus for conducting testing of the condition of computer peripherals, said apparatus being portable and comprising:
(a) a housing for enclosing said apparatus;
(b) a microprocessor for controlling the testing of said peripherals in response to instructions;
(c) at least one PROM having stored therein an operating system routine for said microprocessor, said operating system routine including subroutines for loading and running an instruction set defining a test protocol nd a subroutine for accessing a debugger routine;
(d) at least one RAM for storing said instruction set loaded into said RAM under microprocessor control;
(e) a plurality of circuit board means having mounted thereon at least one EPROM for nonvolatile storage of said instruction set, each said circuit board means corresponding to a different computer peripheral to be tested, such that said plurality of circuit board means enables a user to test a plurality of corresponding peripherals, each said circuit board means further having a memory connector means arranged thereon to enable electrical coupling of said circuit board EPROM to said working memory;
(f) a storage tray mounted in said housing for retaining said plurality of circuit board means in storage, said tray being accessible to the user to allow manual selection of a desired circuit board means corresponding to the peripheral to be tested;
(g) receptor means mounted in said housing, said receptor means being recessed in said housing and being accessible to said user for receiving and electrically mating with said memory connector means on said circuit board means, said receptor means further being in communication with said RAM through said microprocessor to enable transfer of said instruction set from said EPROM to said RAM under microprocessor control;
(h) switching means responsive to said microprocessor for enabling the transfer of said instruction set from said EPROM to said RAM under direction of the operating system routine, whereby said circuit board means can be manually removed from said receptor means and restored in said tray after said transfer;
(i) at least two peripheral connector means accessible to the user from outside said housing, at least one of said peripheral connector means for connecting said apparatus with a peripheral to be tested, and the other of said connector means for connecting said apparatus with a remote station for sending data to said RAM under microprocessor control to modify said instruction set, said peripheral connector means also being connected to said microprocessor for application of excitation signals to said peripheral and the reception of response signals from said peripheral in accordance with said protocol;
(j) a keyboard mounted in said housing and accessible to said user, said keyboard being operatively connected to said microprocessor for receiving user instructions for controlling the operation of said apparatus;
(k) a display mounted in said housing for providing an indication to the user of the condition of the peripheral and the status of the protocol; and
(l) at least one PROM having permanently stored therein a debugger routine accessible by the user through the operating system routine, said debugger routine for responding to commands input from the remote station to instruct the microprocessor to store a modified instruction set in RAM defined by data input from said remote station and test said peripheral in accordance with a modified protocol set forth in the modified instruction set,
whereby the protocol can be modified from said remote station to provide a modified protocol for testing said peripheral.

12. The apparatus of claim 11, wherein said remote station comprises a computer terminal, and said remote station communicates with said connector means through a communications link comprising at least one modem, and the debugger routine further comprises a subroutine for permitting a second user located at the computer terminal to review the contents of working memory and to alter said contents selectively from said terminal to thereby modify said test protocol.

13. The apparatus of claim 12, wherein said debugger routine further includes a subroutine for permitting the computer terminal to be connected to said peripheral being tested through said apparatus, whereby said second user can send data from said computer terminal to said peripheral and said peripheral can communicate directly with said terminal.

14. The apparatus of claim 13 wherein said operating system further comprises a subroutine for giving a continuous indication on said display of the status of said protocol.

15. A method for conducting testing of computer peripherals using a portable peripheral tester having a microprocessor for controlling the testing of said peripherals, non-volatile memory means having stored therein an operating system routine for said microprocessor, working memory means having stored therein an instruction set defining a test protocol for sending excitation signals to said peripheral and monitoring the peripheral's response thereto, peripheral connector means for connecting said peripheral to said apparatus for communications with said microprocessor under operating system control, and external data source connection means, said method comprising the steps of:

(a) operatively coupling a remote station to said data source connection means;

(b) transmitting data from said external data source to said working memory for modifying said instruction set to include a modified protocol;

(c) running said modified protocol to test said peripheral, whereby a user at said external data source can transmit a modified test protocol to said working memory for testing said peripheral.

* * * * *